Patented Mar. 16, 1943

2,313,988

UNITED STATES PATENT OFFICE 2,313,988

AMINE SALTS OF PHENOLS

Edgar C. Britton and Gerald H. Coleman, Midland, Mich., assignors to The Dow Chemical Company, Midland, Mich., a corporation of Michigan No Drawing. Application April 30, 1941, Serial No. 391,094

7 Claims. (Cl. 260—563)

The present invention is concerned with amine salts of phenols and is particularly directed to the addition compounds of phenols with N.N'.N''-tri-(cycloalkyl)-di-(aminoalkyl)-amines having the formula:

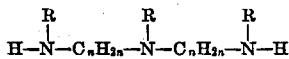

wherein R represents a cycloalkyl radical and $n$ is an integer greater than 1, and to parasiticidal and bactericidal compositions comprising such addition salts as active toxicants. The expression "cycloalkyl" as herein employed includes cyclobutyl-, cyclopentyl-, cyclohexyl-, cycloheptyl-, and the like, and also related radicals such as 2-methyl-cyclohexyl-, 2-phenyl-cyclohexyl-, 4-cyclohexyl-cyclohexyl-, 4-tertiarybutyl-cyclohexyl, 2-methoxy-cyclohexyl, 2-methyl-5-isopropyl-cyclohexyl, etc., such as are derived from substituted cycloalkyl compounds obtained by reduction of the corresponding substituted anilines or phenols.

We have prepared representative members of the above identified group of compounds and found them for the most part to be crystalline solids or thick viscous liquids difficultly soluble in water and somewhat soluble in many organic solvents. These compounds are stable to light and air, and not appreciably affected by carbon dioxide. A preferred group of amine salts are obtained with those amines as described above in which $n$ is an integer from 2 to 5, inclusive, and wherein the nitrogen atoms are attached to adjacent carbon atoms in the aliphatic residues.

The new compounds are prepared by reacting a phenol with a suitable amine compound such as N.N'.N''-tri-(2-methyl-cyclohexyl)-di-(beta-amino-ethyl)-amine, N.N'.N''-tri-(cyclohexyl)-di-(gamma-amino-propyl)-amine, N.N'.N''-tri-(2-methoxy-cyclohexyl)-di-(beta-amino-propyl)-amine, or N.N'.N''-tri-(4-cyclohexyl-cyclohexyl)-di-(beta-amino-n-butyl)-amine. A convenient method of operation comprises the use of a reaction medium of benzene, chloro-benzene, toluene, or alcohol.

In carrying out the reaction any suitable amount of reactants may be employed, although from about 1 to about 3 molecular proportions of the phenol to each molecular proportion of the amine has been found most satisfactory. Where an unreacted excess of one or the other reactant is present in the final product, separation is readily accomplished by extraction of the crude amine addition product with benzene or other selective solvent for the phenol or amine and in which the amine salt is difficultly soluble. In practice the crude addition salt product obtained is generally satisfactory for use in fungicidal, insecticidal, or bactericidal compositions and further has the advantage of being a liquid and, therefore, more readily miscible with many of the organic solvents frequently employed as carriers in parasiticide compositions.

The operating temperatures employed in the reaction are preferably between about 40° and 120° C. and conveniently at the boiling temperature of the reaction mixture when a solvent is employed. While the reactants may simply be mixed together, a convenient method of operation comprises the use of a solvent as set forth above. To insure the formation of a relatively homogeneous product and to minimize occlusion, the amine is preferably added portionwise with stirring to a solution of the phenol over a short period of time. Following completion of the reaction, the mixture is filtered or otherwise manipulated to separate out the amine salt depending upon the physical nature of such product. If the salt is crystalline, it may be purified by washing with small amounts of organic solvents or by recrystallization, and is thereafter dried at a temperature calculated to volatilize residual traces of solvent. If the salt is liquid it may be filtered to remove contaminating sediment or traces of inorganic impurities, or clarified by treatment with activated bone charcoal or other decolorizing agent.

The N.N'.N''-tri-(cycloalkyl)-di-(aminoalkyl)-amines with which this application is concerned as starting materials in the preparation of the above-identified addition salts with phenols are prepared by reacting a cycloalkyl-amine with an alkylene halide or polymethylene halide. Such reaction is preferably carried out in two stages. The first phase of the preparation comprises reacting the cycloalkyl-amine with the dihalo-alkane to produce a mixture comprising N.N'-di-(cycloalkyl)-diamino-alkane and the separation of the latter in substantially pure form. The second phase comprises reacting the N.N'-di-(cycloalkyl)-diamino-alkane with additional dihaloalkane and cycloalkyl-amine to form the N.N'.N''-tri-(cycloalkyl)-di-(amino-alkyl)-amine. Complex heterocyclic amine bodies and higher N-cycloalkyl-substituted polyalkylene polyamines are formed in each phase of the reaction.

A preferred method of operation in the second phase of the reaction comprises introducing a portion only of the dihalo-alkane into the reaction mixture at one time, reacting that portion, and neutralizing the resultant amine hydrohalides with aqueous alkali prior to adding further portions of the dihalo-alkane. Similarly the final product of reaction is treated with alkali in such manner as to change any amine hydrohalides into free bases prior to the separation and purification steps.

In carrying out the above preparation, elevated temperatures and pressures are employed. The optimum conditions of reaction vary with the molecular proportions of reactants employed and with the nature of the dihalo-alkane employed as a starting material. It has been found that higher temperatures and pressures are required when a dichloro-alkane is employed as a starting material than when the corresponding dibromo-alkane is used.

A representative reaction involves the preparation of N.N'.N''-tri-(2-methyl-cyclohexyl)-di-(beta-amino-ethyl)-amine as follows:

73 pounds of 2-methyl-cyclohexyl-amine (hydrogenated ortho-toluidine), 80 pounds of N.N'-di-(2-methyl-cyclohexyl)-ethylene-diamine boiling at 165° C. at 8 mm. pressure and having a specific gravity of 0.92 at 20°/4° C. (prepared by reacting 2 molecular proportions of 2-methyl-cyclohexylamine with one proportion of ethylene bromide), and 10 pounds of water were stirred and heated in a pressure reactor to 110° C. and under autogenous pressure. 60 pounds of ethylene bromide was introduced slowly into the mixture over a period of one-half hour, the temperature of the reaction being gradually increased to 120°–130° C. On the completion of the ethylene bromide addition, the mixture was heated and stirred at 120°–130° C. for an additional hour and 68 pounds of 32 per cent aqueous sodium hydroxide added thereto. Heating and stirring was continued at 125°–130° C. for one-half hour after which an additional 60 pounds of ethylene bromide was added to the mixture in the same manner as previously described. Heating and agitation was continued for one-half hour at 125°–130° C., and the mixture then treated successively with 103 and 80 pound portions of 32 per cent sodium hydroxide at 125°–130° C. for 1.5 hours. The reactor contents were then cooled to 100° C. and 170 pounds of a crude oily amine product separated from the aqueous sodium bromide solution. This crude material was washed with water and fractionally distilled to separate out low boiling fractions and obtain an N.N'.N''-tri(2-methyl-cyclohexyl)-di-(beta-amino-ethyl)-amine product as a residue. This residue may be employed as such or further fractionated under reduced pressure to separate out the substantially pure amine as a thick viscous oil boiling at approximately 205° C. at 2.5 mm. pressure.

The following examples set forth certain embodiments of the invention but are not to be construed as limiting the same.

EXAMPLE 1

9.8 grams (0.025 mol) of N.N'.N''-tri-(2-methyl-cyclohexyl)-di-(beta-amino-ethyl)-amine, 20.0 grams (0.075 mol) of 2.4-dinitro-6-cyclohexyl-phenol, and 25 milliliters of benzene were mixed together and heated on a steam bath with stirring for a period of approximately one-half hour. The mixture was then cooled to room temperature and filtered. The residue from the filtration was washed with cold benzene and air dried, whereby there was obtained 20.5 grams of an N.N'.N''-tri-(2-methyl-cyclohexyl)-di-(beta-amino-ethyl)-amine of a salt of 2.4-dinitro-6-cyclohexyl-phenol as a bright yellow powder melting at 188°–191° C. A saturated water solution of this compound had a pH of 5.9 and contained 0.0017 per cent of the salt at 26° C. The compound was found to be slightly soluble in 95 per cent ethyl alcohol, soluble in carbon tetrachloride, insoluble in cold petroleum distillate, and soluble in hot petroleum distillate.

EXAMPLE 2

45 grams (0.3 mol) of 4-tertiarybutyl-phenol and 39 grams (0.1 mol) of N.N'.N''-tri-(2-methyl-cyclohexyl)-di-(beta-amino-ethyl)-amine were mixed together. Considerable heat of reaction was evolved and the mixture was placed on a steam bath and heated to 90° C. with stirring for about one-half hour. On cooling to room temperature there was obtained a crude amine addition salt product as a reddish-brown viscous liquid having a specific gravity of 0.985 at 25°/25° C. A saturated water solution of this crude salt had a pH of 7.6 and contained 0.0047 per cent of dissolved product.

EXAMPLE 3

In a similar manner 9.8 grams (0.025 mol) of N.N'.N''-tri-(2-methyl-cyclohexyl)-di-(beta-amino-ethyl)-amine and 14.9 grams (0.075 mol) of mono-ethyl-2-hydroxy-diphenyl (boiling at 155°–160° C. at 10 mm. pressure) were mixed together with the liberation of appreciable heat of reaction. The mixture was then heated on a steam bath for a short while and thereafter cooled to obtain a crude amine addition product as a viscous amber liquid having a specific gravity of 1.035 at 25°/25° C. A saturated water solution of the crude salt had a pH of 9.1 and was found to contain 0.0023 per cent of dissolved product.

Other amines which may be employed substantially as shown in the foregoing examples to obtain addition salts of phenols include N.N'.N''-tri-(cyclohexyl)-di-(beta-amino-ethyl)-amine, N.N'.N''-tri-(2-methyl-5-isopropyl-cyclohexyl)-di-(delta-amino-butyl)-amine, N.N'.N''-tri-(2-cyclohexyl-cyclohexyl)-di-(beta-amino-amyl)-amine, etc. In place of the phenols shown in the examples, other representative hydroxy-aromatic compounds, such as 2.4-dinitro-phenol, 2.4-dinitro-6-ethyl-phenol, 2.4-dinitro-5-n-hexyl-phenol, 2.4-dinitro-6-chloro-phenol, 2.4-dinitro-6-methyl-phenol, 2.6-dinitro-4-methyl-phenol, 2.5-dinitro-4-cyclohexyl-phenol, 2.4-dinitro-5-naphthylamino-phenol, 2.4-dinitro-5-orthotoluidino-phenol, phenol, ortho-cresol, meta-cresol, paracresol, 3.5-dimethyl-phenol, 4-tertiary-amyl-phenol, 2-methyl-4-isopropyl-phenol, 2-methyl-5-isopropyl-phenol, 2-isopropyl-5-methyl-phenol, 2-cyclohexyl-phenol, 4-cyclohexyl-phenol, 2-phenylphenol, 2-phenyl-4-chloro-phenol, 2.5-dichloro-phenol, 2.4.6-trichloro-phenol, 2.3.4.6-tetrachloro-phenol, pentachloro-phenol, 2.4-dichloro-6-phenyl-phenol, 2- bromo-4-phenyl-phenol, 2-phenyl-4-iodo-phenol, and the like, may be employed.

The N.N'.N''- tri - (cycloalkyl) - di - (aminoalkyl) amine addition salts of phenols as set forth in the preceding examples may be used as active toxicants in either bactericidal or parasiticidal spray and dust compositions. While many of these compounds exert a fungicidal and bactericidal action, others have been found particularly well adapted for use in insecticidal compositions.

When employed for the control of plant parasites the amine salts of the dinitro-phenols are particularly valuable. These compounds are preferably dispersed in or on solid, finely divided, inert carriers such as diatomaceous earth, volcanic ash, bentonite, talc, finely divided wood flour, and the like. When such compositions are to be dusted on plants, an amount of the amine salt equivalent to from about 0.5 to about 5 per cent by weight of the total dust composition is preferably employed in the mixture.

Dispersions of the salt on or in inert carriers may also be employed in water suspension as agricultural sprays for dormant or summer application to growing trees or as eradicant fungicides. In preparing dust mixtures for use in such aqueous mixtures, the amine salts may be employed in amount up to approximately 50 per cent by weight of the finely divided concentrate, although from 15 to 25 per cent by weight is preferred. Similarly aqueous dispersions of the amine salts are useful in parasite control.

Various wetting, sticking, and dispersing agents such as glyceryl oleate, alkali metal caseinates, aluminum naphthenate, alkali metal salts of sulfonated aromatic hydrocarbons and phenols, sodium lauryl sulphate, partially neutralized sulfuric acid derivatives of fatty acids and their esters, blood albumen, soap and the like may be employed in combination with the new amine salts. Similarly the amine salts can be combined with other insecticidal and fungicidal agents such as petroleum, fish and vegetable oils, lead arsenate, sulfur, copper spray, and the like for the control of various insect and fungous pests.

Representative compositions employed for the control of agricultural insects include the following:

*Composition 1*

| Material | Amount |
|---|---|
| N.N'.N''-tri-(2-methyl-cyclo-hexyl)-di-(beta-amino-ethyl)-amine salt of 2.4-dinitro-6-cyclohexyl-phenol. | Saturated water solution. |
| Sodium lauryl sulphate | 0.3 pound. |
| Water | 100 gallons. |

This composition was employed as a spray for the control of red spider and gave 100 per cent kill within 3 days.

| Material | Amount |
|---|---|
| N.N'.N''-tri-(2-methyl-cyclo-hexyl)-di-(beta-amino-ethyl)-amine salt of 2.4-dinitro-6-cyclohexyl-phenol. | 20 parts by weight. |
| Diatomaceous earth | 80 parts by weight. |

The amine salt and diatomaceous earth were ground together to produce a dust concentrate. Sufficient of this mixture was dispersed in water to yield a concentration of 0.3 pound of the amine salt per 100 gallons of water and employed as a spray for the control of Colorado Potato Beetle larva. A 79 per cent kill was obtained in 2 days.

In a further insecticidal adaptation, 0.1 per cent by weight of the N.N'.N''-tri-(2-methyl-cyclohexyl) - di-(beta-amino-ethyl)-amine salt of 4-tertiary-butyl-phenol was dissolved in beta-(2.4.6 - trichloro-phenoxy)-beta'-chloro-diethyl-ether. The latter compound has utility as a fly spray toxicant but undergoes decomposition upon exposure to light and air so as to develop objectionable odor and become corrosive to metallic surfaces. The combination of this ether compound with the amine salt results in a composition having improved properties as regards insecticidal toxicity and stability.

The present application is a continuation-in-part of our copending application Serial No. 349,224, filed August 1, 1940.

We claim:

1. An N.N'.N'' - tri-(cycloalkyl) - di-(aminoalkyl)-amine salt of a phenol.

2. An N.N'.N''-tri-(2-methyl-cyclohexyl)-di-(beta-amino-ethyl)-amine salt of a phenol.

3. An N.N'.N''-tri-(cycloalkyl)-di-(amino-alkyl)-amine salt of dinitro-phenol.

4. An N.N'.N'' - tri - (cycloalkyl)-di-(aminoalkyl)-amine salt of 2.4-dinitro-6-cyclohexyl-phenol.

5. A parasiticidal composition comprising as a toxic ingredient an N.N'.N''-tri-(cycloalkyl)-di-(amino-alkyl)-amine salt of a monohydric phenol.

6. A parasiticidal composition comprising as a toxic ingredient an N.N'.N''-tri-(cycloalkyl)-di-(amino-alkyl)-amine salt of a dinitro-phenol containing a total of 2 nitro groups, one attached in the para position and the other in one of the positions ortho to the phenolic hydroxyl group.

7. A parasiticidal composition comprising as a toxic ingredient the N.N'.N''-tri-(2-methyl cyclohexyl)-di-(beta-amine-ethyl)-amine salt of 2.4-dinitro-6-cyclohexyl-phenol.

EDGAR C. BRITTON.
GERALD H. COLEMAN.